(12) United States Patent
Shih et al.

(10) Patent No.: US 8,469,573 B2
(45) Date of Patent: Jun. 25, 2013

(54) LIGHT GUIDE PLATE AND BACK LIGHT MODULE HAVING THE SAME

(75) Inventors: Hsi-Hsin Shih, Tainan County (TW); Chien-Tsung Wu, Tainan County (TW); Chih-Hao Tsai, Tainan County (TW); Chin-Ming Wang, Tainan County (TW); Hung-Wen Wang, Tainan County (TW)

(73) Assignee: Chi Lin Optoelectronics Co., Ltd., Tainan (TW)

( * ) Notice: Subject to any disclaimer, the term of this patent is extended or adjusted under 35 U.S.C. 154(b) by 305 days.

(21) Appl. No.: 12/887,292

(22) Filed: Sep. 21, 2010

(65) Prior Publication Data
US 2011/0199783 A1 Aug. 18, 2011

Related U.S. Application Data

(60) Provisional application No. 61/303,829, filed on Feb. 12, 2010.

(51) Int. Cl.
*F21V 7/04* (2006.01)
(52) U.S. Cl.
USPC ............ 362/606; 362/623; 362/607; 362/620
(58) Field of Classification Search
USPC ................... 362/606, 607, 620, 626
See application file for complete search history.

(56) References Cited

U.S. PATENT DOCUMENTS

| | | | |
|---|---|---|---|
| 6,092,904 A * | 7/2000 | Tai et al. | 362/603 |
| 6,174,064 B1 * | 1/2001 | Kalantar et al. | 362/255 |
| 7,108,415 B2 | 9/2006 | Hayakawa | |
| 2004/0062028 A1 * | 4/2004 | Winston et al. | 362/31 |
| 2008/0151554 A1 | 6/2008 | Burkard | |
| 2008/0304287 A1 * | 12/2008 | Chiang et al. | 362/618 |

FOREIGN PATENT DOCUMENTS

| | | |
|---|---|---|
| TW | 421720 | 2/2001 |
| TW | I276882 | 3/2007 |

OTHER PUBLICATIONS

English Abstract of TW 421720.
English Abstract of TW I276882.

* cited by examiner

*Primary Examiner* — Evan Dzierzynski
(74) *Attorney, Agent, or Firm* — WPAT, P.C.; Anthony King

(57) ABSTRACT

The present invention relates to a light guide plate and back light module having the same. The light guide plate includes a light guide plate body and a plurality of microreliefs. The light guide plate body has a light-emitting surface and a reflecting surface. The microreliefs are disposed on the reflecting surface. Each of the microreliefs has an outer surface and a base area. The outer surface is a curved surface, and the base area contacts the reflecting surface. A ratio of the totally height of each of the microreliefs to the diameter of the base area of each of the microreliefs is between 1/7 and 1/4. As a result, the light guide plate has higher light extraction efficiency.

19 Claims, 3 Drawing Sheets

LIGHT GUIDE PLATE AND BACK LIGHT MODULE HAVING THE SAME

CROSS-REFERENCE TO RELATED APPLICATIONS

This application claims the benefit of U.S. Provisional Patent Application No. 61/303,829 filed Feb. 12, 2010.

BACKGROUND OF THE INVENTION

1. Field of the Invention

The present invention relates to a light guide plate and back light module having the same, and more particularly to a light guide plate having a plurality of microreliefs disposed on the reflecting surface thereof.

2. Description of the Related Art

FIG. 1 shows a schematic view of a conventional back light module. The back light module 1 comprises a light source 11, a reflector 12, a light guide plate 13 and films 16. The films 16 comprise a diffusion film, an enhanced brightness film and so on. The light source 11, for example, a LED light bar or CCFL, is used to provide a light beam. The reflector 12 is disposed below the light guide plate 13, and is used to reflect part of the light beam back to the light guide plate 13.

The light guide plate 13 is used to receive and mix the light beam from the light source 11. The light guide plate 13 includes a light guide plate body 14 and an ink 15. The light guide plate body 14 has a reflecting surface 141, a light-emitting surface 142 and a light incident surface 143. The reflecting surface 141 is opposite the light-emitting surface 142, and the light incident surface 143 is adjacent to the reflecting surface 141 and the light-emitting surface 142. The light source 11 faces the light incident surface 143, so that the light beam enters the light guide plate body 14 through the light incident surface 143 and then is transmitted to the films 16 through the light-emitting surface 142. The material of the light guide plate body 14 is transparent polymer, for example, polymethyl methacrylate (PMMA) or polycarbonate (PC).

The ink 15 is printed on the reflecting surface 141 of the light guide plate body 14 to form a pattern, so as to reflect the light beam back to the interior of the light guide plate body 14. The ink 15 includes a base resin, a filler, a solvent, an additive and a curing agent. The material of the base resin is epoxy resin, polyester resin, acrylic resin, polyvinyl resin, polyamide resin or polyurethane resin. The material of the filler and the additive are inorganic, for example, silica ($SiO_2$).

The disadvantage of the conventional back light module 1 is described as follows. As shown in FIG. 2, the light beam reflected by the ink 15 will scatter with large angle, such as the light beam 18. The light beam 18 will cause total internal reflection on the light-emitting surface 142, and then propagates continuously in the interior of the light guide plate body 14. As a result, only part of the light beam is transmitted out of the light guide plate body 14, thus the light extraction efficiency is limited.

Therefore, it is necessary to provide a light guide plate and back light module having the same to solve the above problems.

SUMMARY OF THE INVENTION

The present invention is directed to a light guide plate which comprises a light guide plate body and a plurality of microreliefs. The light guide plate body has a light-emitting surface and a reflecting surface. The microreliefs are disposed on the reflecting surface. Each of the microreliefs has an outer surface and a base area. The outer surface is a curved surface, and the base area contacts the reflecting surface. A ratio of the height of each of the microreliefs to the diameter of the base area of each of the microreliefs is between 1/7 and 1/4. A light beam from the light guide plate body is reflected by the microreliefs and then emitted from the light-emitting surface.

The present invention is further directed to a light guide plate which comprises a light guide plate body, an intermediate layer and a plurality of microreliefs. The light guide plate body has a light-emitting surface and a reflecting surface. The intermediate layer is disposed on the reflecting surface of the light guide plate body, and the intermediate layer is a low surface energy material. The microreliefs, are disposed on the intermediate layer. Each of the microreliefs has an outer surface and a base area. The outer surface is a curved surface, and the base area contacts the intermediate layer. A light beam from the light guide plate body is reflected by the microreliefs and then emitted from the light-emitting surface.

In present invention, the light guide plate has higher light extraction efficiency because of the microreliefs and the intermediate layer.

DETAILED DESCRIPTION OF THE INVENTION

Figure 1:
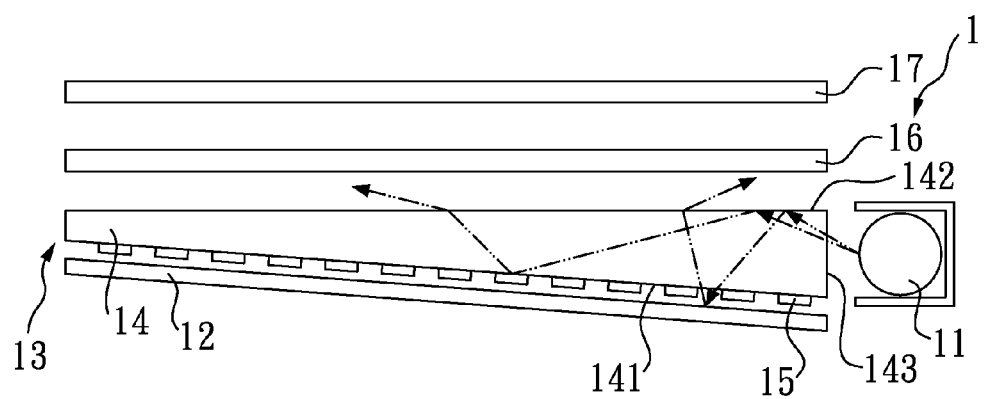
FIG. 1 is a schematic view of a conventional backlight module.
Figure 2:
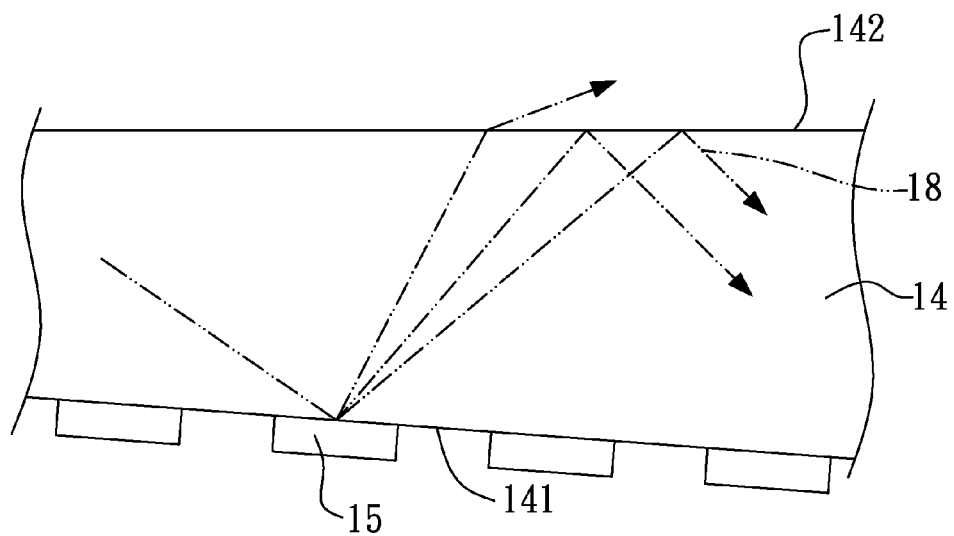
FIG. 2 is a schematic view illustrating the path of the light beam in the light guide plate of FIG. 1.
Figure 3:
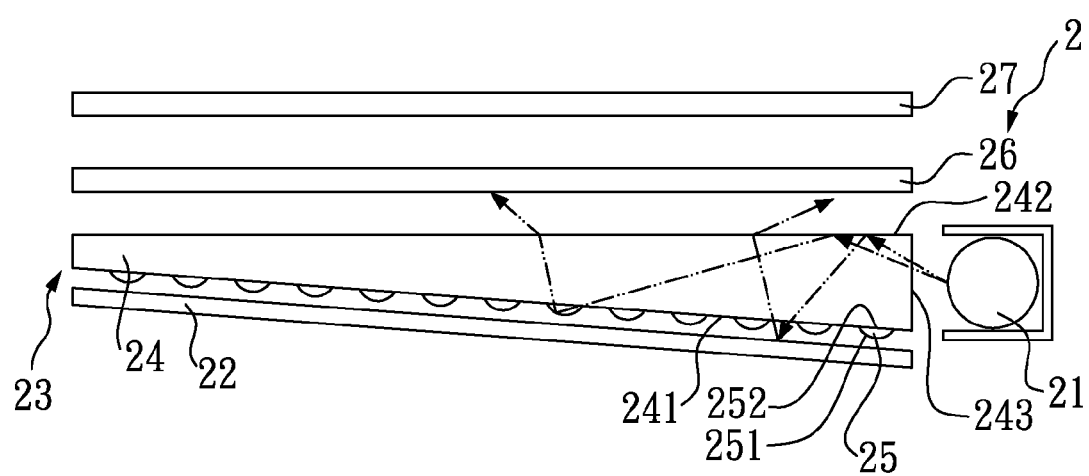
FIG. 3 is a schematic view of a back light module according to a first embodiment of the present invention.

FIG. 3 shows a schematic view of a back light module according to a first embodiment of the present invention. The back light module 2 comprises a light source 21, a reflector 22, a light guide plate 23 and films 26. The films 26 comprise a diffusion film, an enhanced brightness film and so on. The light source 21, for example, a LED light bar or CCFL, is used to provide a light beam. The reflector 22 is disposed below the light guide plate 23, and is used to reflect part of the light beam back to the light guide plate 23.

Figure 4:
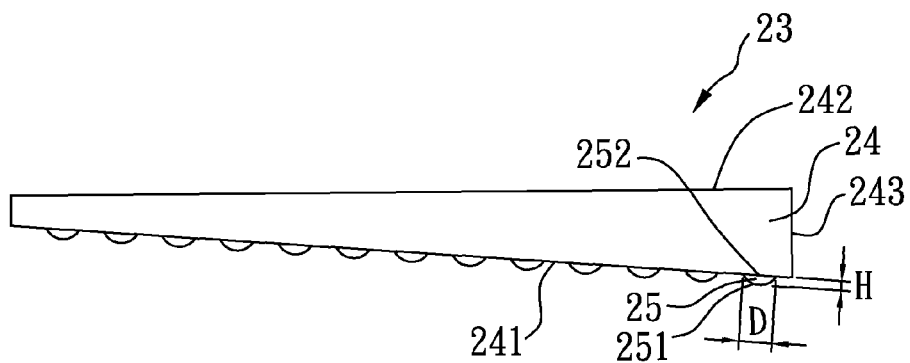
FIG. 4 is a schematic view of a light guide plate according to a first embodiment of the present invention.

FIG. 4 shows a schematic view of a light guide plate according to a first embodiment of the present invention. The light guide plate 23 is used to receive and mix the light beam from a light source (not shown). The light guide plate 23 comprises a light guide plate body 24 and a plurality of microreliefs 25. The light guide plate body 24 has a reflecting surface 241, a light-emitting surface 242 and a light incident surface 243. The reflecting surface 241 is opposite the light-emitting surface 242, and the light incident surface 243 is adjacent to the reflecting surface 241 and the light-emitting surface 242. The light source faces the light incident surface 243, so that the light beam enters the light guide plate body 24 through the light incident surface 243 and is then transmitted out through the light-emitting surface 242. The material of the light guide plate body 24 is transparent polymer, preferably polymethyl methacrylate (PMMA), arcylic-based polymer, polycarbonate (PC), polyethylene terephthalate (PET) or polystyrene (PS) or a copolymer thereof.

Figure 5:
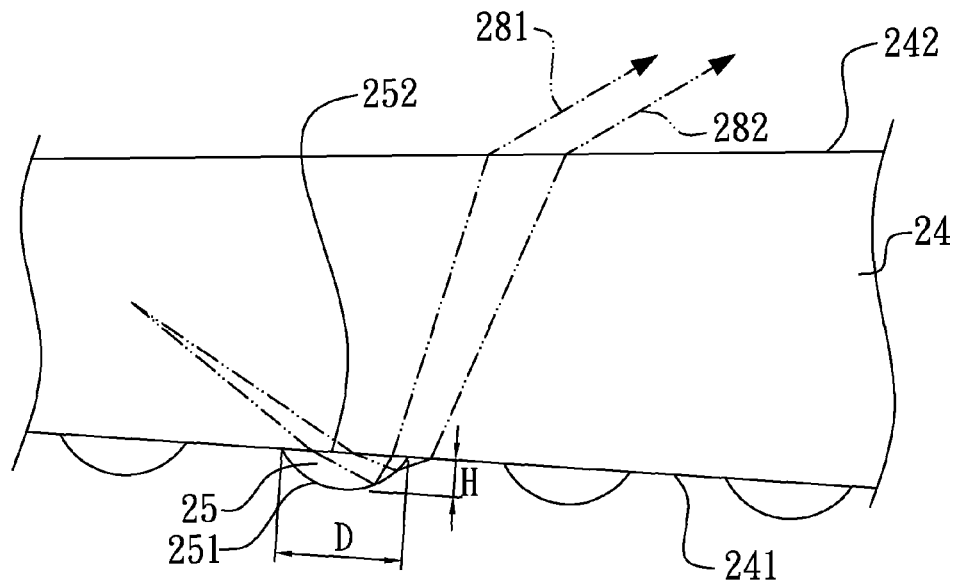
FIG. 5 is a schematic view illustrating the path of the light beam in the light guide plate of FIG. 4.

The microreliefs 25 are disposed adjacent to the reflecting surface 241 of the light guide plate body 24. The light beam from the light guide plate body 24 is reflected and diffused by the microreliefs 25 and then emitted from the light-emitting surface 242, as shown in FIG. 5. Each of the microreliefs 25 has an outer surface 251 and a base area 252. The outer surface 251 is a curved surface, and the base area 252 contacts the reflecting surface 241. In the embodiment, the shape of each of the microreliefs 25 is substantially semi-sphere, whose appearance is like a lens, and the base area 252 is substantially circular. The ratio of the height H of each of the microreliefs 25 to the diameter D of the base area 252 of each of the microreliefs 25 is between 1/7 and 1/4, preferably, between 1/6 and 1/5. The diameter D of the base area 252 is below 80 μm, preferably, below 30 μm.

In the embodiment, the microreliefs 25 are disposed on the reflecting surface 241 of the light guide plate body 24 to form a pattern, so as to reflect and diffuse the light beam back to the light guide plate body 24. Preferably, the microreliefs 25 are ink, which is printed on the reflecting surface 241. The microreliefs 25 is transparent and can be organic, inorganic or compound material.

FIG. 5 shows a schematic view illustrating the path of the light beam in the light guide plate of FIG. 4. The mechanism of transmission of the light beam in the microreliefs 25 is reflecting and refracting rather than scattering, which results in high coupling efficiency and high light extraction efficiency. As shown in the figure, the light beam 281 is reflected by the outer surface 251 of the microrelief 25 and back to the light guide plate body 24. In addition, the light beam 282 passes through the outer surface 251 of the microrelief 25 into the air, and then enters the light guide plate body 24 again through the reflecting surface 241. Both the light beams 281, 282 are emitted from the light-emitting surface 242. As shown in the figure, the light is emitted from light source (not shown) then enter light guide plate body 24, and then be reflected and diffused by the microreliefs 25. Therefore, the microreliefs 25 of the embodiment could diffuse light and mix the light more uniform, and then enhances the uniformity and average luminance.

Figure 6:
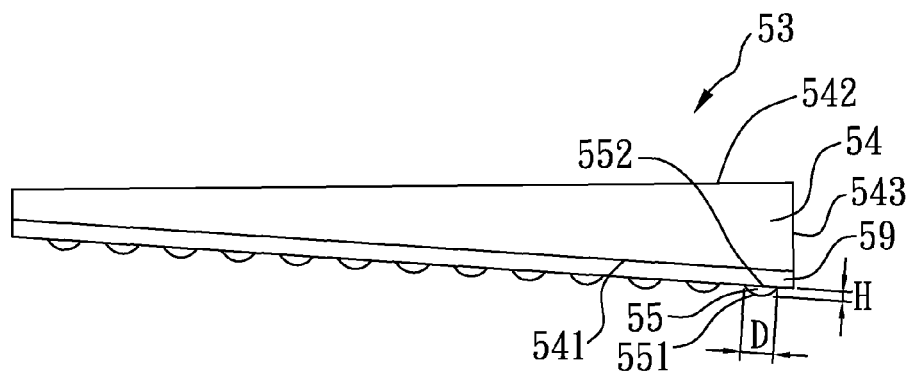
FIG. 6 is a schematic view of a light guide plate according to a second embodiment of the present invention.

FIG. 6 shows a schematic view of a light guide plate according to a second embodiment of the present invention. The light guide plate 53 is used to receive and mix the light beam from a light source (not shown). The light guide plate 53 comprises a light guide plate body 54, a plurality of microreliefs 55 and an intermediate layer 59. The light guide plate body 54 has a reflecting surface 541, a light-emitting surface 542 and a light incident surface 543. The reflecting surface 541 is opposite the light-emitting surface 542, and the light incident surface 543 is adjacent to the reflecting surface 541 and the light-emitting surface 542. The light source faces the light incident surface 543, so that the light beam enters the light guide plate body 54 through the light incident surface 543 and is then transmitted out through the light-emitting surface 542. The material of the light guide plate body 54 is transparent polymer, preferably polymethyl methacrylate (PMMA), arcylic-based polymer, polycarbonate (PC), polyethylene terephthalate (PET) or polystyrene (PS) or a copolymer thereof.

The intermediate layer 59 is disposed on the reflecting surface 541 of the light guide plate body 54, and the microreliefs 55 (such as ink) are disposed on the intermediate layer 59. In other words, the intermediate layer 59 is disposed between the light guide plate body 54 and the microreliefs 55, so as to control the height and the diameter of the microreliefs 55 during manufacturing process. The intermediate layer 59 is a low surface energy material. Preferably, the material of the intermediate layer 59 is fluoride, teflo or silicide, and the surface energy of the intermediate layer 59 is below 30 dyne/cm. The surface energy of the material can influence the shape of the ink when ink is printed on a surface. Generally, a low surface energy material can provide H/D preferably. In addition, in the embodiment, the refractive index of the light guide plate body 54 is greater than that of the intermediate layer 59, and the refractive index of the microreliefs 55 is greater than that of the intermediate layer 59.

The microreliefs 55 are disposed on the intermediate layer 59 to form a pattern, so as to reflect the light beam back to the light guide plate body 54. Preferably, the microreliefs 55 are ink, which is printed on the intermediate layer 59. The material of the microreliefs 55 is transparent and can be organic, inorganic or compound material.

The microreliefs 55 are substantially same as the microreliefs 25 in the first embodiment (FIGS. 4 and 5). Each of the microreliefs 55 has an outer surface 551 and a base area 552. The outer surface 551 is a curved surface, and the base area 552 contacts the intermediate layer 59. In the embodiment, the shape of each of the microreliefs 55 is substantially semi-sphere, whose appearance is like a lens, and the base area 552 is substantially circular. The ratio of the height H of each of the microreliefs 55 to the diameter D of the base area 552 of each of the microreliefs 55 is between 1/7 and 1/4, preferably, between 1/6 and 1/5. The diameter D of the base area 552 is below 30 μm, preferably, below 30 μm.

Table 1 below shows the panels 17, 27 disposes above the films 16, 26 to measure the average luminance and the central luminance of forty nine points, and ΔX and ΔY of nine points by a color analyzer (model: CA-210), wherein the size of each of the panels 17, 27 is 26 inch. The films 16, 26 comprise a diffusion film, an enhanced brightness film and so on. The "49 points Ave. Lum." is the average luminance of the forty nine points. The "Central Lum." is the luminance of the central point. The "9 points ΔX" is the difference between maximum and minimum of nine points in the CIE 1931 color space, and the "9 points ΔY" is the difference between maximum and minimum of nine points in the CIE 1931 color space.

TABLE 1 comparison of optical effects of conventional light guide plate 13, light guide plate 23 of the first embodiment and light guide plate 53 of the second embodiment, wherein the material of the light guide plate bodies 14, 24, 54 is PMMA, the microreliefs 15, 25, 55 are ink, and the surface energy of the intermediate layer 59 is 22.86 dyne/cm.

| Light guide size: 26 inch | 49 points Ave. Lum. | 9 points ΔX | 9 points ΔY | Central Lum. |
|---|---|---|---|---|
| Prior art (conventional light guide plate 13) | 374 nit | 0.0061 | 0.0080 | 418 nit |
| first embodiment (light guide plate 23) | 379 nit | 0.0047 | 0.0070 | 476 nit |
| second embodiment (light guide plate 53) | 397 nit | 0.0016 | 0.0051 | 503 nit |

Compared with the conventional light guide plate 13, the light guide plate 23 of the first embodiment and the light guide plate 53 of the second embodiment have higher average luminance and central luminance on the surface of the panel. Thus, the microreliefs 25, 55 of the present invention cause higher light extraction efficiency.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A light guide plate, comprising:
   a light guide plate body, having a light-emitting surface and a reflecting surface; and
   a plurality of microreliefs, disposed on the reflecting surface, each of the microreliefs having an outer surface and a base area, the outer surface being a curved surface, the base area contacting the reflecting surface, and a ratio of the height of each of the microreliefs to the diameter of the base area of each of the microreliefs is between 1/7 and 1/4,
   wherein a light beam from the light guide plate body is reflected by the outer surface of one of the microreliefs and then emitted from the light-emitting surface, and another light beam from the light guide plate body passes through the outer surface of the microreliefs into the air, then enters the light guide plate body again through the reflecting surface and then is emitted from the light-emitting surface.

2. The light guide plate as claimed in claim 1, wherein the diameter of the base area is below 80 μm.

3. The light guide plate as claimed in claim 2, wherein the diameter of the base area is below 30 μm.

4. The light guide plate as claimed in claim 1, wherein the material of the light guide plate body is polymethyl methacrylate (PMMA), arcylic-based polymer, polycarbonate (PC), polyethylene terephthalate (PET), polystyrene (PS) or a copolymer thereof.

5. The light guide plate as claimed in claim 1, wherein the material of the microreliefs is same as that of the light guide plate body.

6. The light guide plate as claimed in claim 1, wherein the microreliefs are ink.

7. The light guide plate as claimed in claim 1, wherein the shape of each of the microreliefs is substantially semi-sphere, and the base area is substantially circular.

8. The light guide plate as claimed in claim 1, wherein the ratio is between 1/6 and 1/5.

9. A light guide plate, comprising:
   a light guide plate body, having a light-emitting surface and a reflecting surface;
   an intermediate layer, disposed on the reflecting surface of the light guide plate body, the intermediate layer being a low surface energy material; and
   a plurality of microreliefs, disposed on the intermediate layer, each of the microreliefs having an outer surface and a base area, the outer surface being a curved surface, the base area contacting the intermediate layer, wherein a ratio of the totally height of each of the microreliefs to the diameter of the base area of each of the microreliefs is between 1/7 and 1/4,
   wherein a light beam from the light guide plate body is reflected by the outer surface of one of the microreliefs and then emitted from the light-emitting surface, and another light beam from the light guide plate body passes through the outer surface of the microreliefs into the air, then enters the light guide plate body again through the reflecting surface and then is emitted from the light-emitting surface.

10. The light guide plate as claimed in claim 9, wherein surface energy of the intermediate layer is below 30 dyne/cm.

11. The light guide plate as claimed in claim 9, wherein the diameter of the base area is below 80 μm.

12. The light guide plate as claimed in claim 11, wherein the diameter of the base area is below 30 μm.

13. The light guide plate as claimed in claim 9, wherein the material of the light guide plate body is polymethyl methacrylate (PMMA), arcylic-based polymer, polycarbonate (PC), polyethylene terephthalate (PET), polystyrene (PS) or a copolymer thereof.

14. The light guide plate as claimed in claim 9, wherein the microreliefs are ink.

15. The light guide plate as claimed in claim 9, wherein the shape of each of the microreliefs is substantially semi-sphere, and the base area is substantially circular.

16. The light guide plate as claimed in claim 9, wherein the ratio is between 1/6 and 1/5.

17. The light guide plate as claimed in claim 9, wherein the refractive index of the light guide plate body is greater than that of the intermediate layer, and the refractive index of the microreliefs is greater than that of the intermediate layer.

18. The light guide plate as claimed in claim 9, wherein the material of the intermediate layer is fluoride, teflo or silicide.

19. A back light module, comprising:
   a light source, used to provide a light beam; and
   a light guide plate, comprising:
   a light guide plate body, having a light-emitting surface, a reflecting surface and a light incident surface; and
   a plurality of microreliefs, disposed on the reflecting surface, each of the microreliefs having an outer surface and a base area, the outer surface being a curved surface, the base area contacting the reflecting surface, and a ratio of the height of each of the microreliefs to the diameter of the base area of each of the microreliefs is between 1/7 and 1/4,
   wherein the light source faces the light incident surface, so that a part of the light beam enters the light guide plate body through the light incident surface and is reflected by the outer surface of one of the microreliefs and then emitted from the light-emitting surface, and another part of the light beam passes through the outer surface of the microreliefs into the air, then enters the light guide plate body again through the reflecting surface and then is emitted from the light-emitting surface.

* * * * *